United States Patent
Coffman

(10) Patent No.: US 12,394,263 B2
(45) Date of Patent: Aug. 19, 2025

(54) ANALYTICAL DIGITAL TWIN FOR NONDESTRUCTIVE INSPECTION OF A VEHICLE

(71) Applicant: THE BOEING COMPANY, Chicago, IL (US)

(72) Inventor: Mathew A. Coffman, Weldon Spring, MO (US)

(73) Assignee: The Boeing Company, Arlington, VA (US)

( * ) Notice: Subject to any disclaimer, the term of this patent is extended or adjusted under 35 U.S.C. 154(b) by 540 days.

(21) Appl. No.: 17/643,728

(22) Filed: Dec. 10, 2021

(65) Prior Publication Data

US 2023/0186698 A1  Jun. 15, 2023

(51) Int. Cl.
*G07C 5/08* (2006.01)
*G06F 16/22* (2019.01)
*B64F 5/60* (2017.01)

(52) U.S. Cl.
CPC ......... *G07C 5/085* (2013.01); *G06F 16/2264* (2019.01); *G07C 5/0825* (2013.01); *B64F 5/60* (2017.01)

(58) Field of Classification Search
CPC ... G07C 5/085; G07C 5/0825; G06F 16/2264; B64F 5/60; G01N 29/043; G01N 29/0609; G01N 29/0654; G01N 29/069; G01N 29/225; G01N 29/265; G01N 29/4472; G06T 7/0002; G06T 7/33
See application file for complete search history.

(56) References Cited

U.S. PATENT DOCUMENTS

| | | | |
|---|---|---|---|
| 6,220,099 B1* | 4/2001 | Marti | G01N 27/902 73/633 |
| 7,865,316 B2 | 1/2011 | Turner et al. | |
| 9,250,213 B1 | 2/2016 | Bossi et al. | |
| 9,519,844 B1* | 12/2016 | Thompson | G06F 18/24 |
| 2010/0253496 A1* | 10/2010 | Nishikawa | G01D 7/00 340/459 |
| 2015/0348253 A1* | 12/2015 | Bendall | H04N 7/183 348/86 |
| 2017/0148101 A1* | 5/2017 | Franke | G06T 7/0004 |
| 2021/0302374 A1* | 9/2021 | Jack | G01N 29/4445 |

* cited by examiner

*Primary Examiner* — Catherine T. Rastovski
*Assistant Examiner* — Lal C Mang
(74) *Attorney, Agent, or Firm* — Harrity & Harrity, LLP

(57) ABSTRACT

A system for non-destructive testing (NDT) a surface of a vehicle includes a track that is securable to the surface, and a sensor that is movable along the track to perform a scan of a region of the surface. The system also includes a computer to generate a baseline image of the surface from the scan, and define a map of the surface from a computer model of the surface. The baseline image includes a matrix of baseline data points, and the map includes a matrix of locations on the surface. The computer correlates the baseline image and the map to produce a mapped baseline image including the matrix of baseline data points registered to the locations on the surface. The mapped baseline image is formatted for NDT of the surface, and may thereby serve as an analytical digital twin for the NDT.

20 Claims, 15 Drawing Sheets

ANALYTICAL DIGITAL TWIN FOR NONDESTRUCTIVE INSPECTION OF A VEHICLE

TECHNOLOGICAL FIELD

The present disclosure relates generally to inspection of vehicles such as aircraft and, in particular, to an analytical digital twin for non-destructive testing of a vehicle.

BACKGROUND

Non-destructive testing (NDT) of a vehicle involves thoroughly examining the vehicle without harming or requiring its significant disassembly. Non-destructive testing is typically preferred to avoid the schedule, labor and costs associated with removal of a part for inspection, as well as avoidance of the potential for damaging the vehicle. Non-destructive testing is advantageous for many applications in which a thorough inspection of the exterior and/or interior of a structure is required. For example, non-destructive testing is commonly used in the aircraft industry to inspect aircraft structures for any type of anomaly such as an internal or external damage to or defects (flaws) in the structure. Inspection may be performed during manufacturing or after the completed structure has been put into service, including field testing, to validate the integrity and fitness of the structure.

A number of NDT techniques may involve remote inspection through imagery of the vehicle. In many current NDT techniques, imaging data is not mapped back to the coordinate system of the vehicle, which may be expressed in a computer model of the vehicle. The imaging data therefore cannot be used as a direct input into analytical tools, which are consequently stand-alone systems.

It would therefore be desirable to have a system and method that takes into account at least some of the issues discussed above, as well as other possible issues.

BRIEF SUMMARY

Example implementations of the present disclosure are directed to inspection of vehicles such as aircraft and, in particular, to an analytical digital twin for non-destructive testing (NDT) of a vehicle. According to some example implementations, an analytical digital twin may be created by registration of test data features using computer vision. The analytical digital twin may include one or more images generated from scans of the surface of the vehicle using a sensor of an analytical system, which may scan the surface using an electromagnetic (e.g., infrared, radio frequency, magnetic) technique. According to some example implementations, a baseline image of the surface may include baseline data points that may be mapped and thereby registered to locations on the surface in a coordinate system of the vehicle, and this mapped baseline image may serve as the analytical digital twin.

A test image of the surface may be generated, and feature recognition may be used to detect features in the mapped baseline image (serving as the analytical digital twin) and corresponding features in the test image, and these may be used to align the test image to the mapped baseline image. The test image may include test data points that may then be mapped to the locations on the surface from the mapped baseline image. An anomaly on the surface may be detected from the thereby mapped test image, using any of a number of suitable techniques such as those that involve computer vision, machine learning or the like.

The present disclosure thus includes, without limitation, the following example implementations.

Some example implementations provide a system for non-destructive testing a surface of a vehicle, the system comprising: a track that is securable to the surface of the vehicle, and that is structured so that the track is contoured to the surface when secured; and an analytical system including a sensor that is movable along the track to perform a scan of a region of the surface, and a computer configured to: generate a baseline image of the surface from the scan, the baseline image having a dot matrix data structure with a matrix of baseline data points; define a map of the surface from a computer model of the surface, the map including a matrix of locations on the surface in a coordinate system of the vehicle; and correlate the baseline image and the map to produce a mapped baseline image that includes the matrix of baseline data points registered to the locations from the matrix of the locations, the mapped baseline image formatted for non-destructive testing of the surface without the track.

Some example implementations provide a system for non-destructive testing a surface of a vehicle, the system comprising: a sensor configured to perform a scan of a region of the surface, without a track secured to the surface; and a computer configured to at least: generate a test image of the surface from the scan, the test image having a dot matrix data structure with a matrix of test data points; access a mapped baseline image of the surface that includes a matrix of baseline data points registered to locations from a matrix of locations on the surface in a coordinate system of the vehicle; correlate the test image and the mapped baseline image to produce a mapped test image that includes the matrix of test data points registered to respective locations on the surface in the coordinate system of the vehicle; and perform a non-destructive testing of the surface based on the mapped test image. 44

Some example implementations provide a method of non-destructive testing a surface of a vehicle, the method comprising: securing a track to the surface of the vehicle, the track structured so that the track is contoured to the surface when secured; moving a sensor along the track to perform a scan of a region of the surface; generating a baseline image of the surface from the scan, the baseline image having a dot matrix data structure with a matrix of baseline data points; defining a map of the surface from a computer model of the surface, the map including a matrix of locations on the surface in a coordinate system of the vehicle; and correlating the baseline image and the map to produce a mapped baseline image that includes the matrix of baseline data points registered to the locations from the matrix of the locations, the mapped baseline image formatted for non-destructive testing of the surface without the track.

Some example implementations provide a method of non-destructive testing a surface of a vehicle, the method comprising: performing a scan of a region of the surface with a sensor, without a track secured to the surface; generating a test image of the surface from the scan, the test image having a dot matrix data structure with a matrix of test data points; accessing a mapped baseline image of the surface that includes a matrix of baseline data points registered to locations from a matrix of locations on the surface in a coordinate system of the vehicle; correlating the test image and the mapped baseline image to produce a mapped test image that includes the matrix of test data points registered to respective locations on the surface in the coordinate system of the vehicle; and performing a non-destructive testing of the surface based on the mapped test image.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 4:
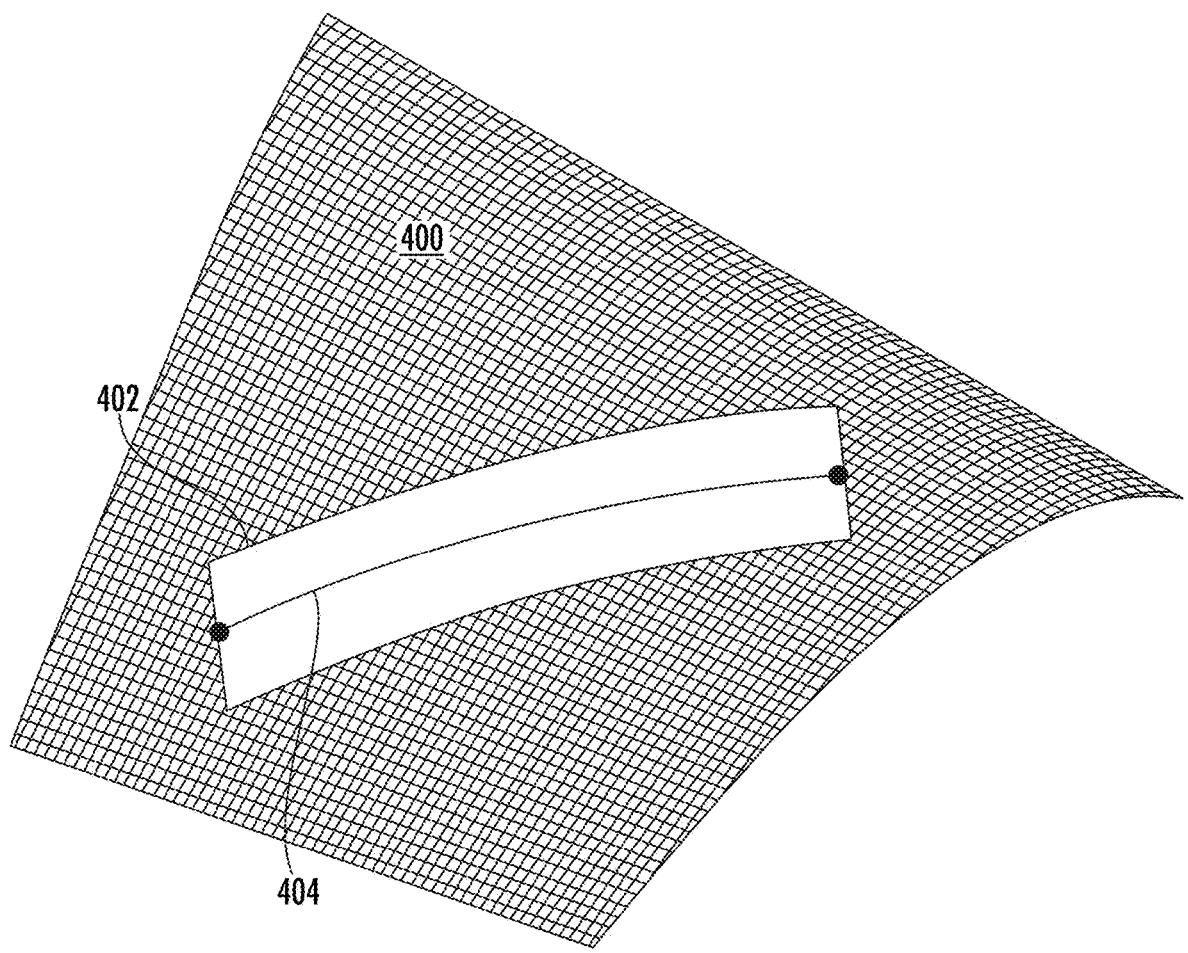
Figure 5:
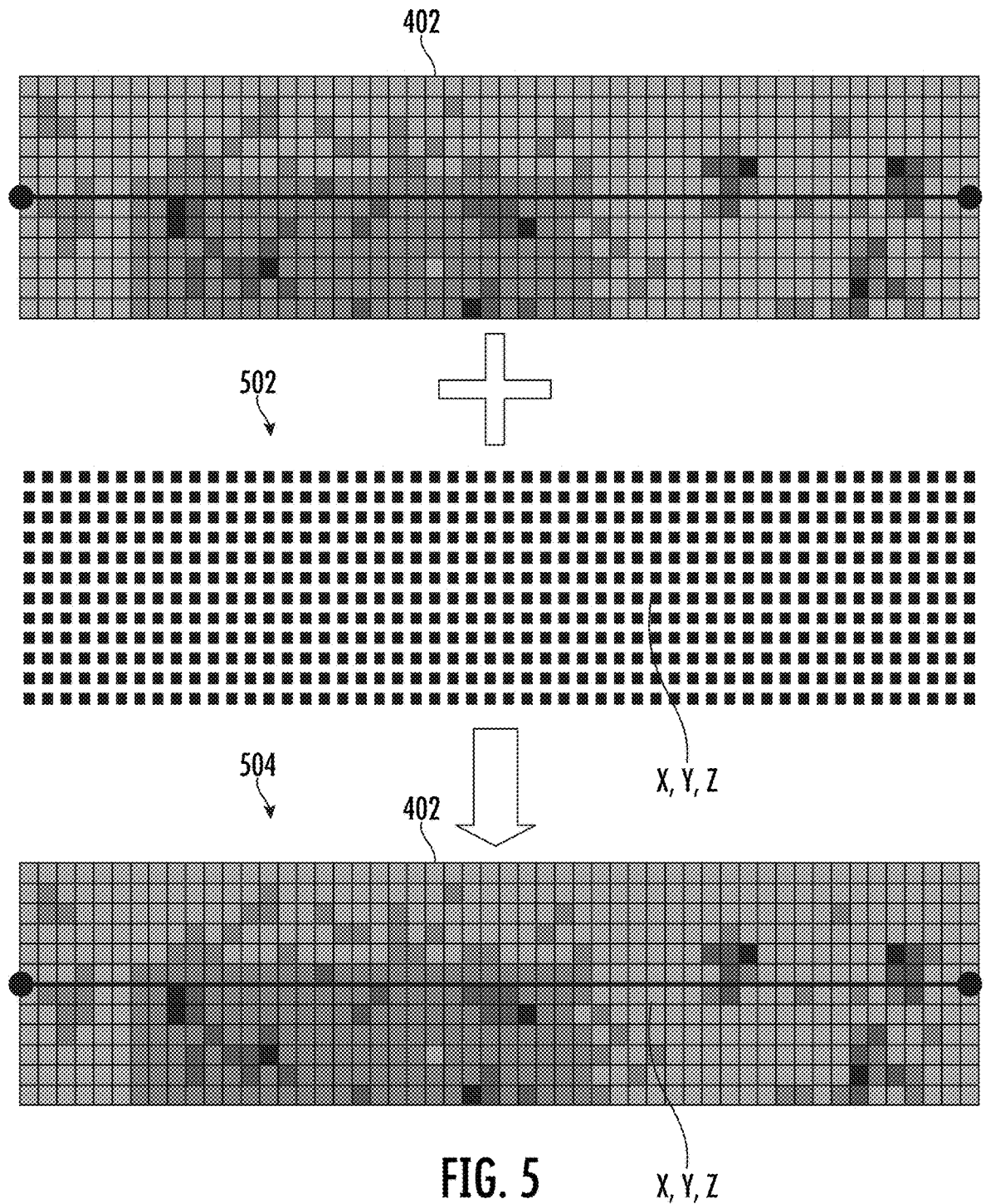
Figure 6:
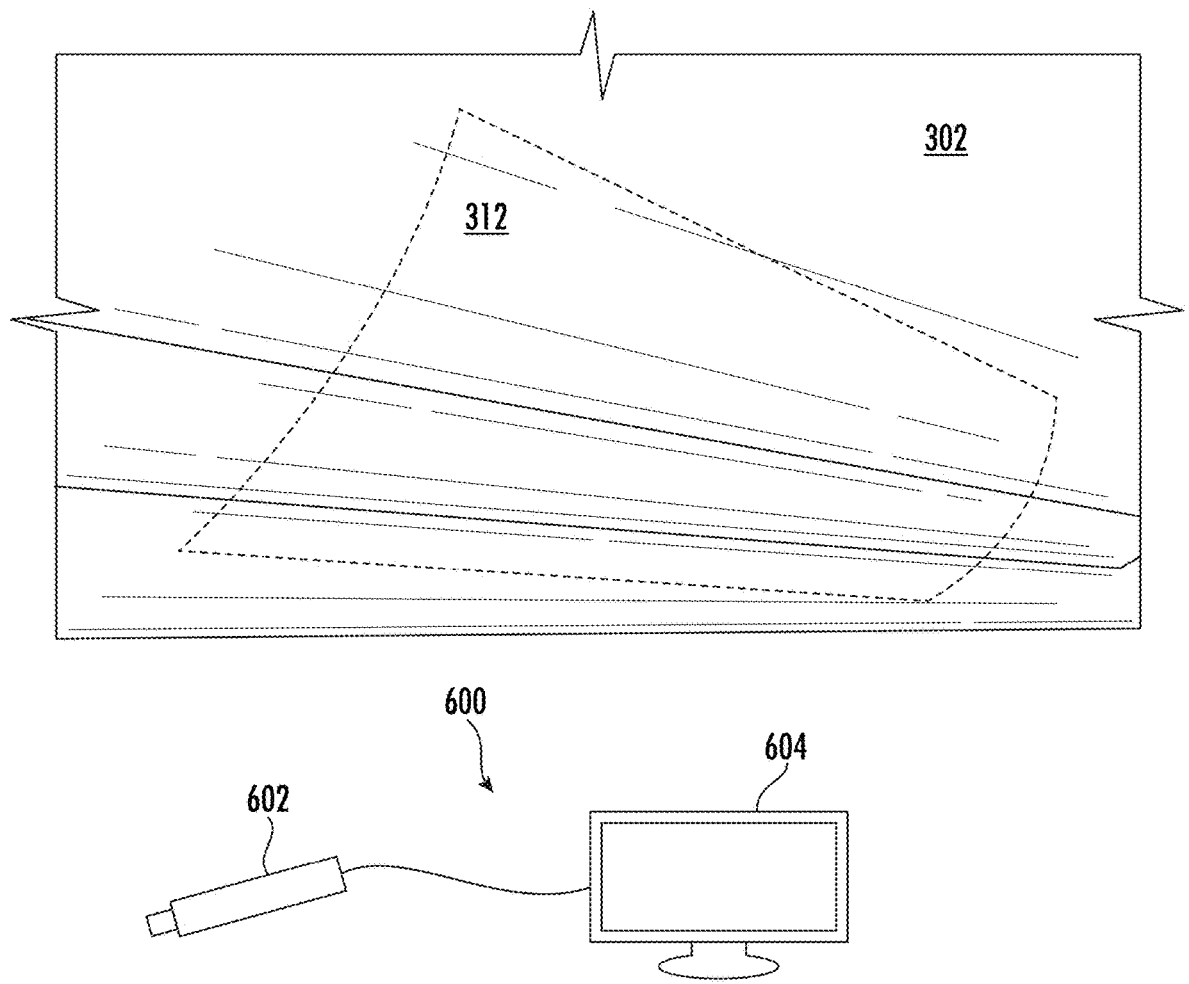
Figure 7:
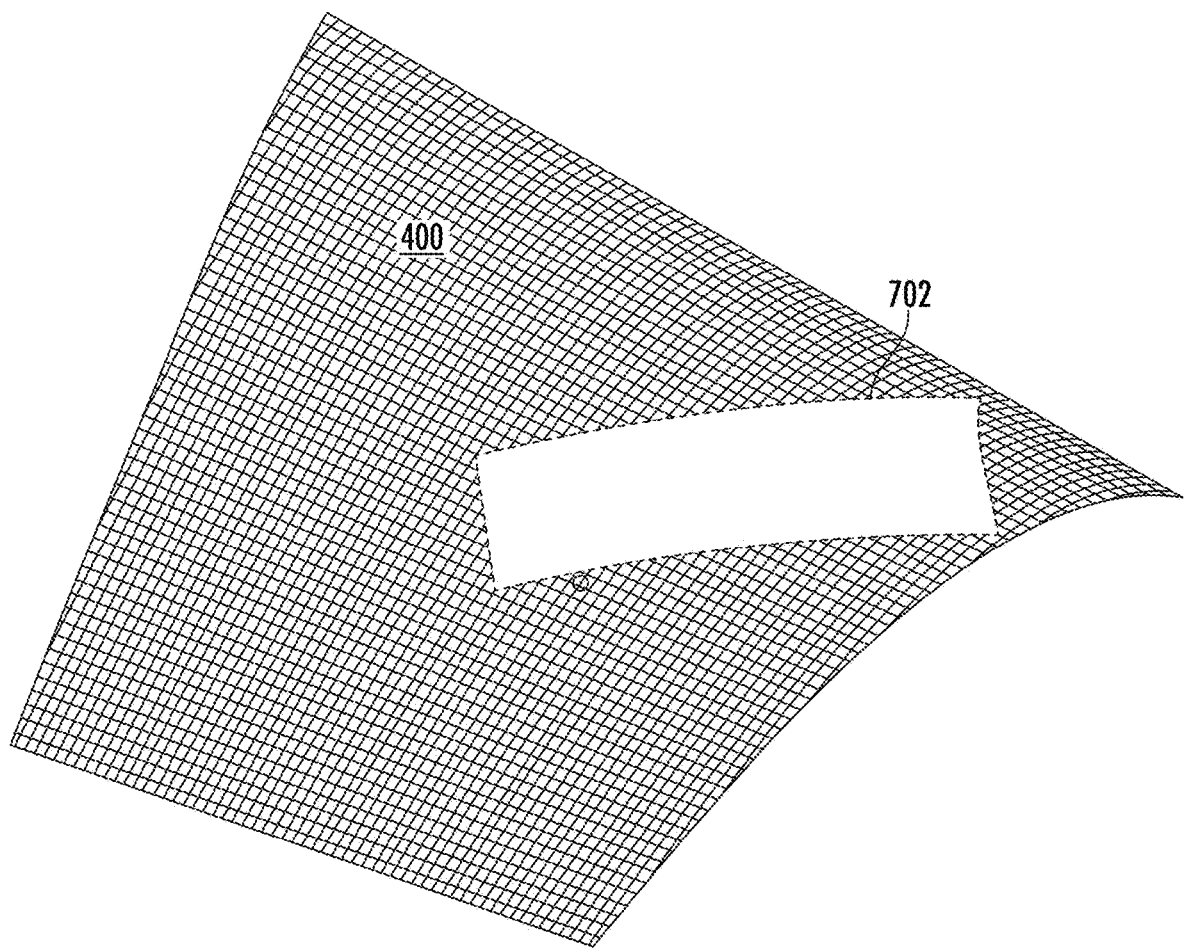
Figure 8A:
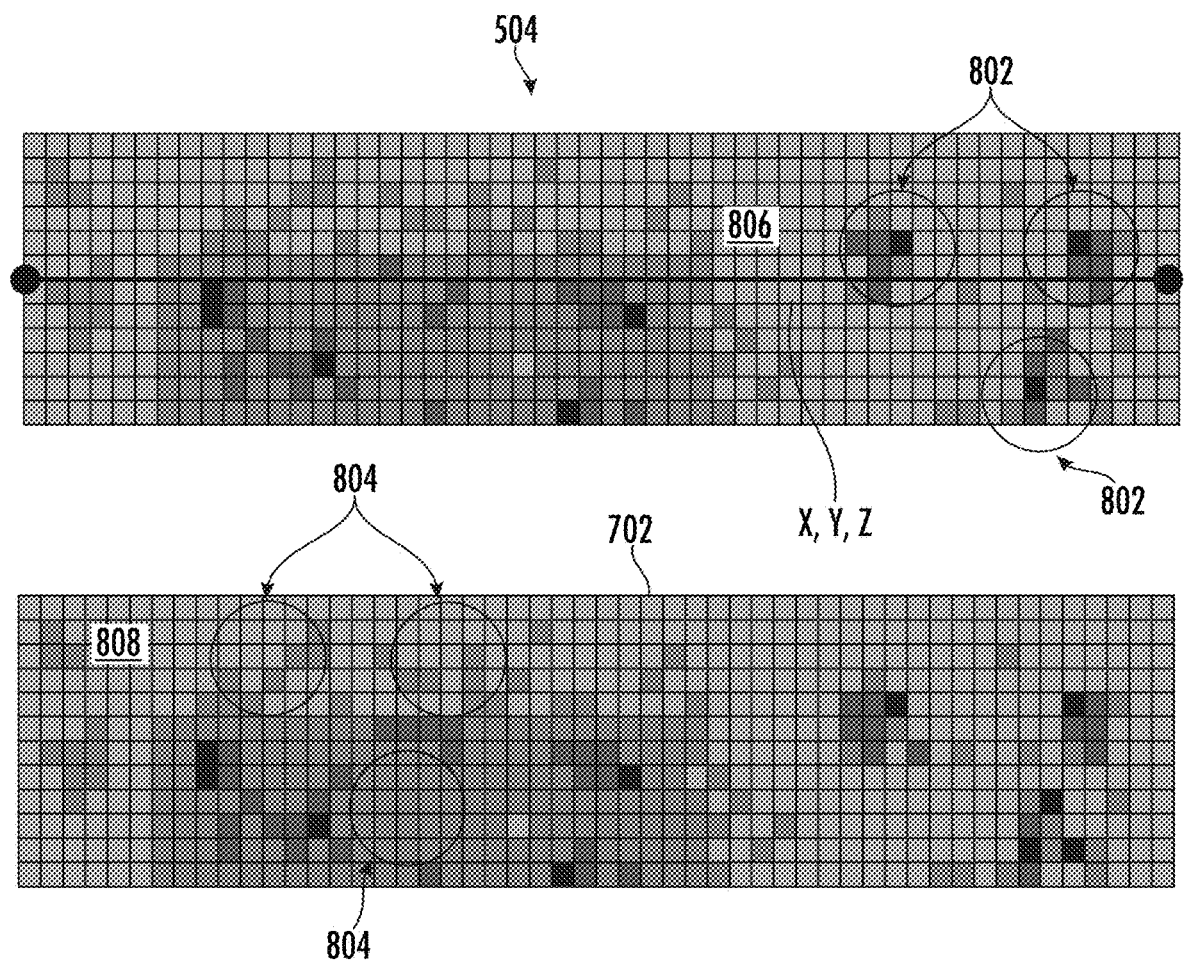
Figure 8B:
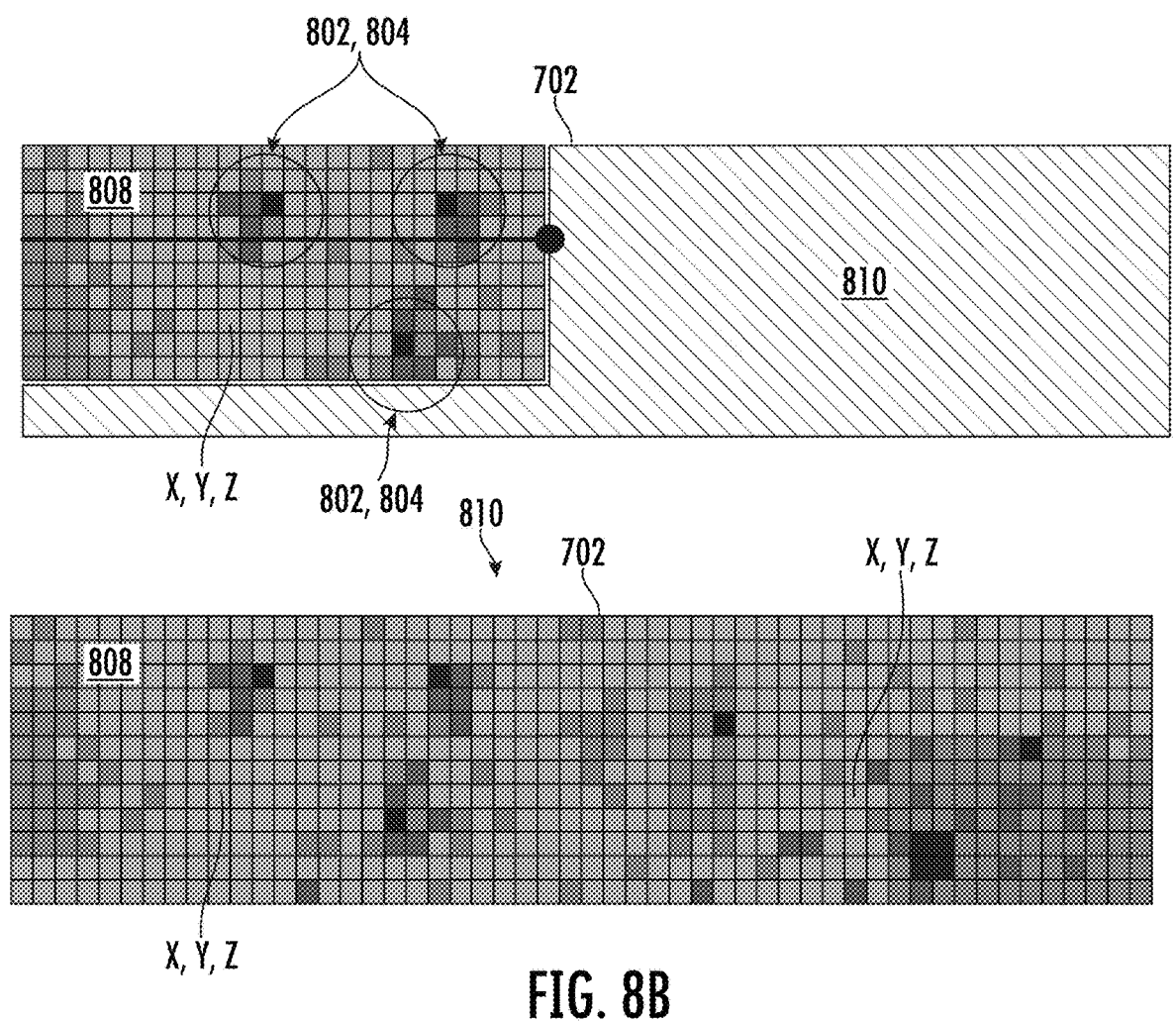
Figure 9:
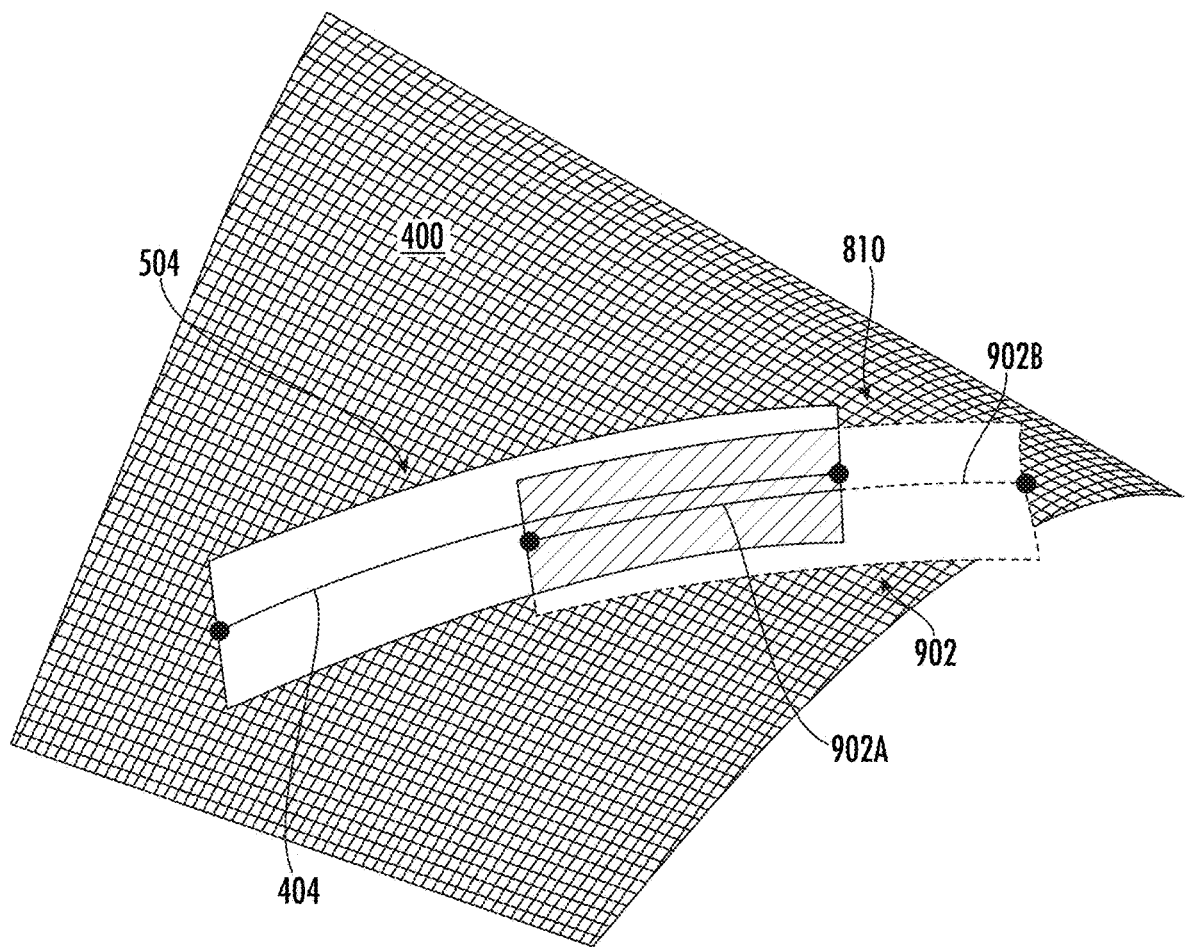
Figure 10:
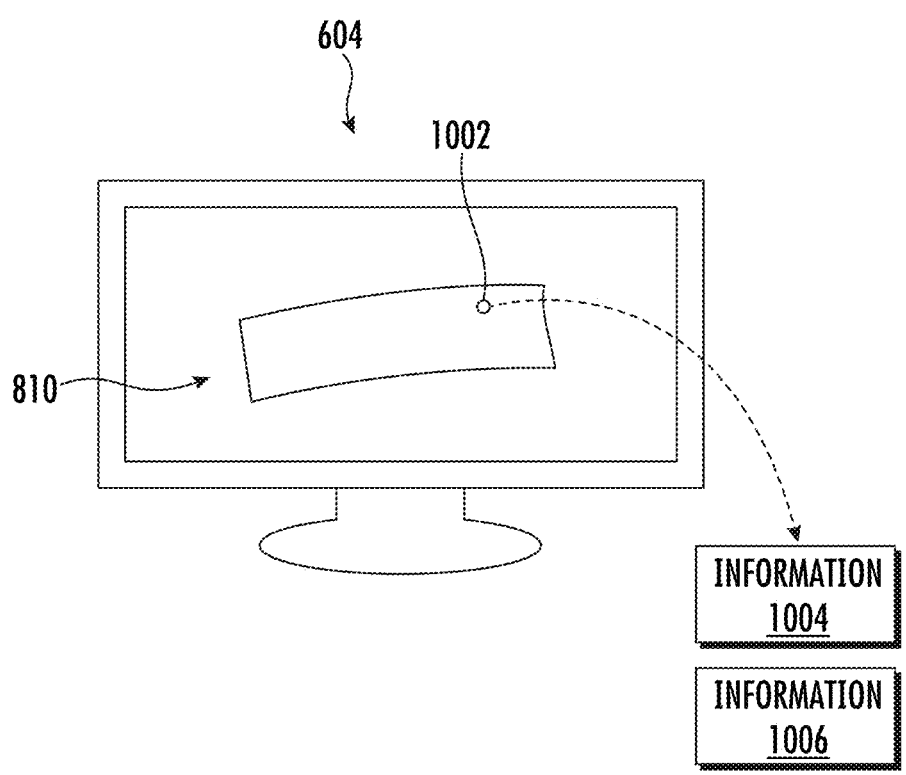
Figure 11A:
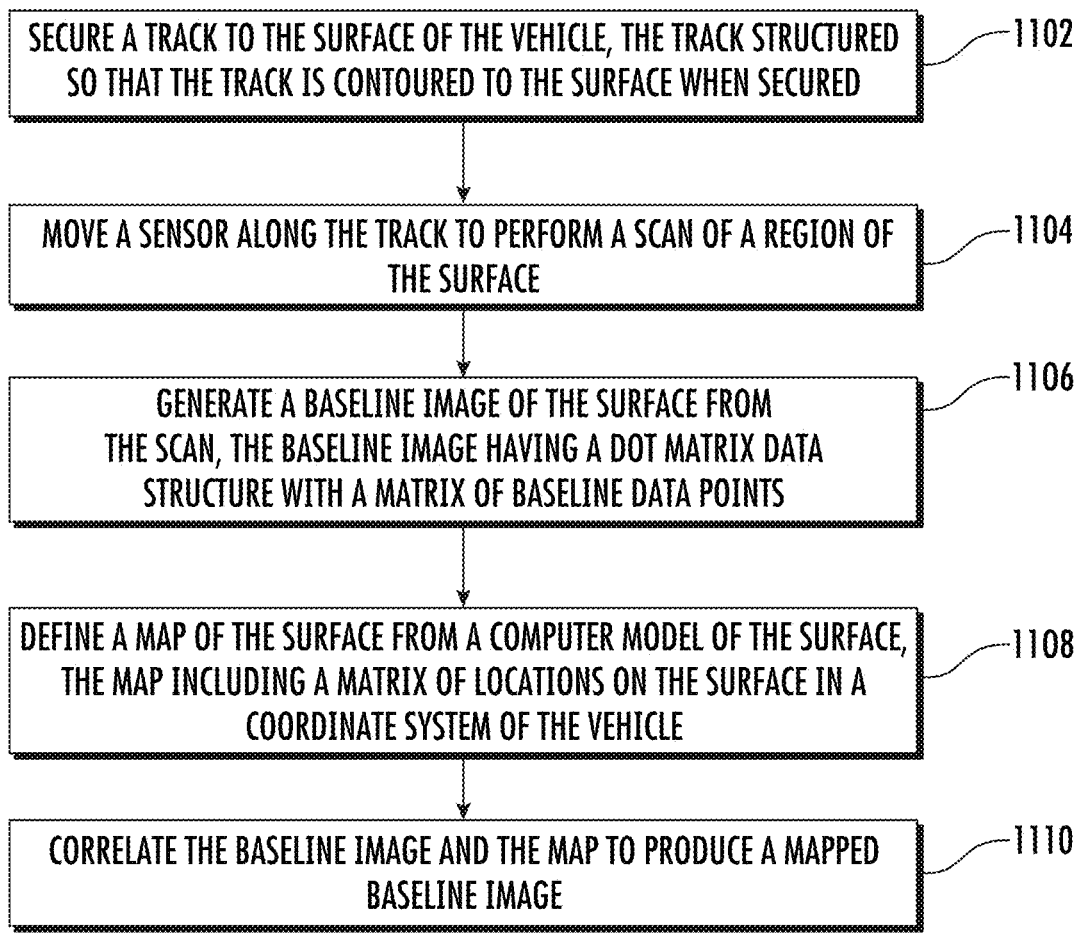
Figure 11B:
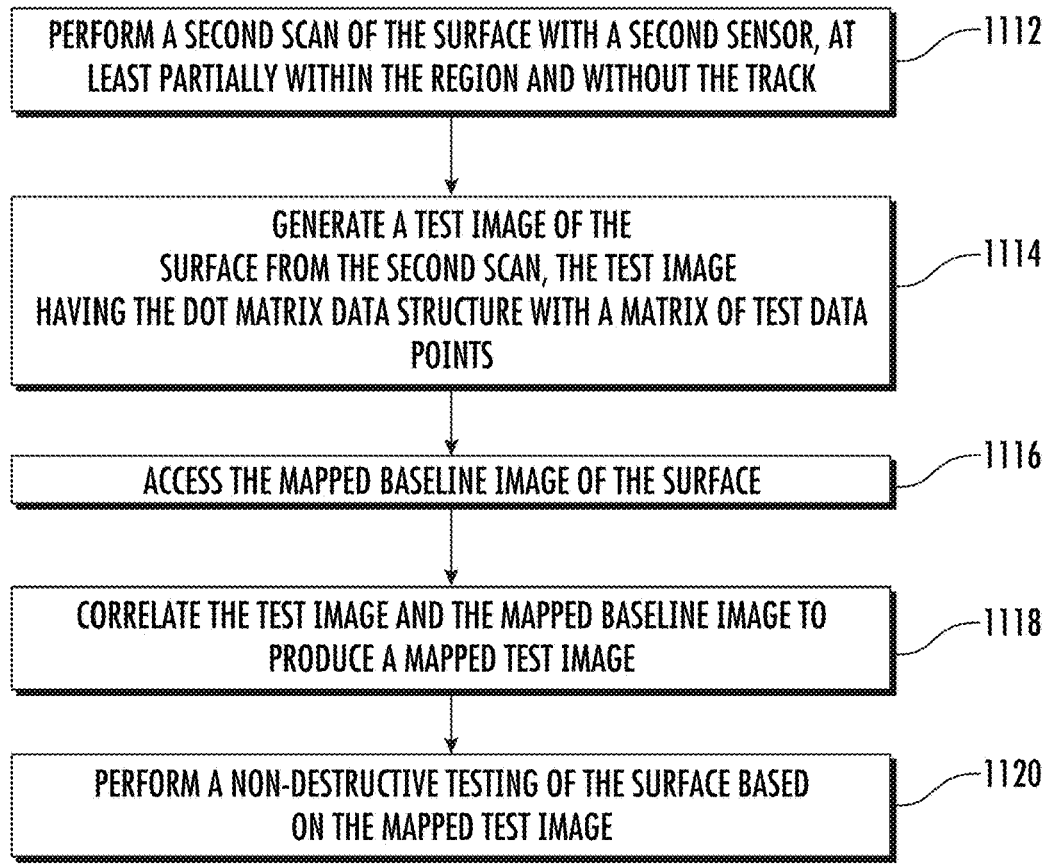
Figure 11C:
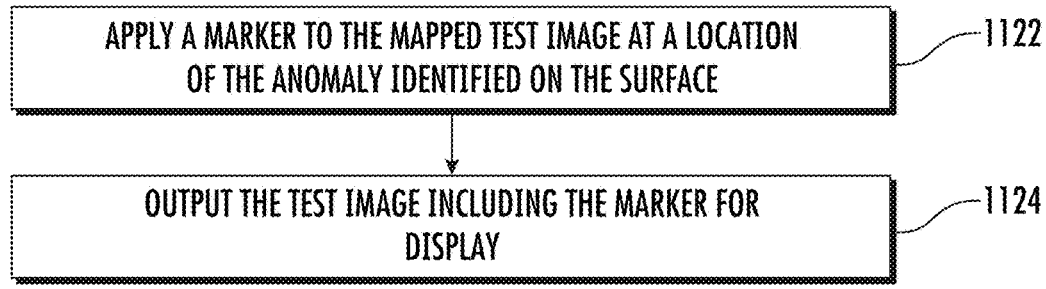
Figure 11D:
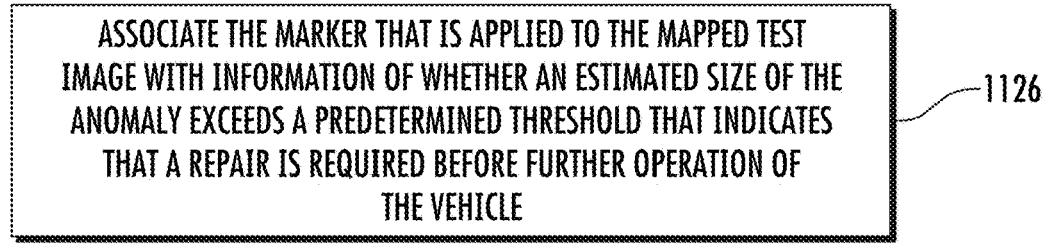
Figure 11E:
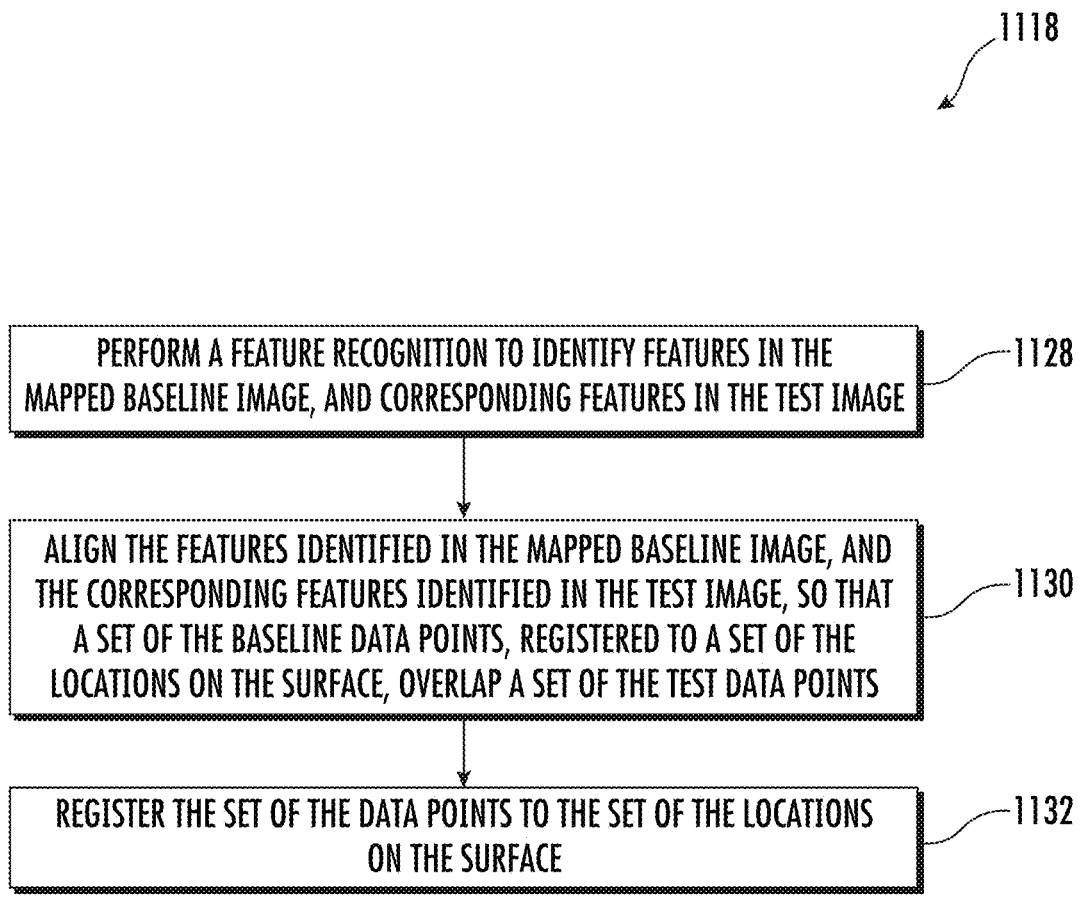
Figure 11F:
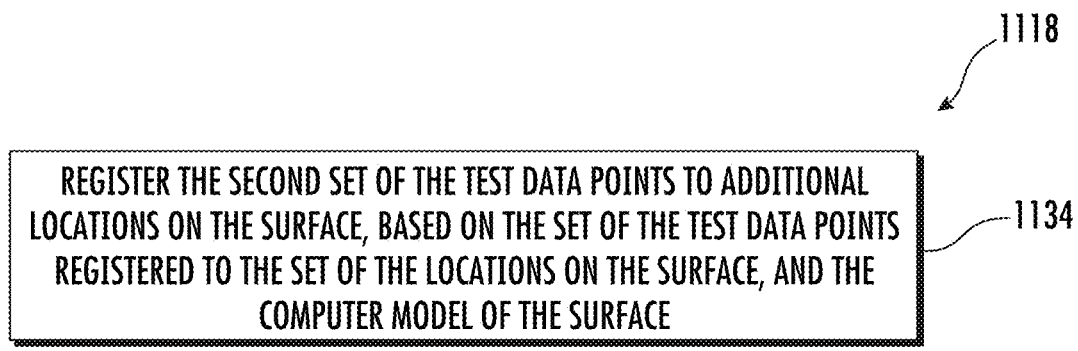
Figure 12:
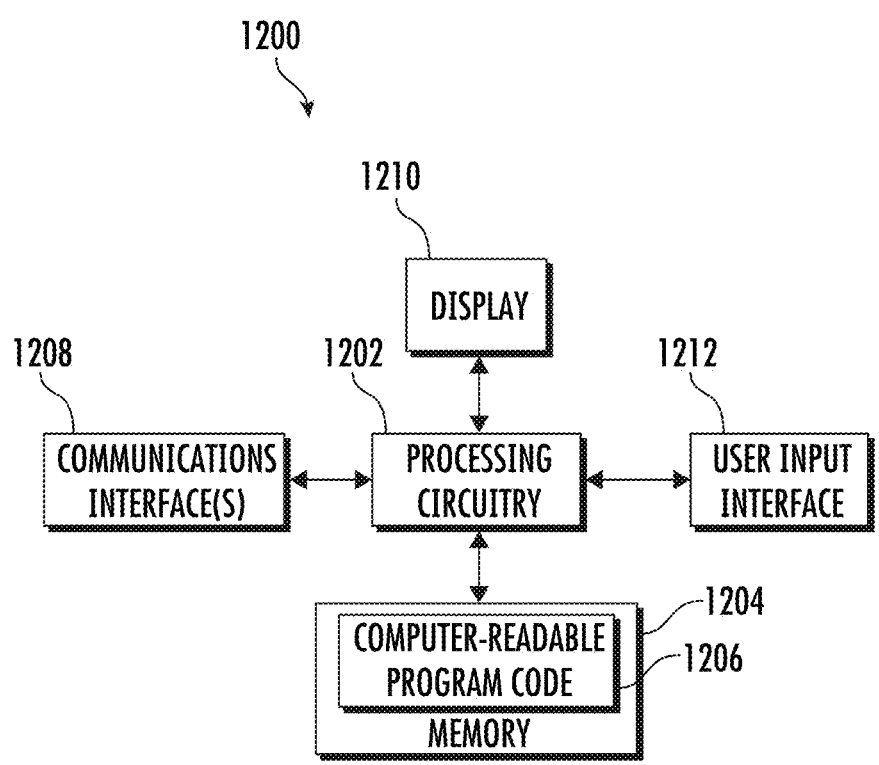

FIG. 4 schematically illustrates a surface, and a baseline image of the surface that may be generated from a scan, according to some example implementations;

FIG. 5 schematically illustrates production of a mapped baseline image from the baseline image, according to some example implementations;

FIG. 6 illustrates a testing system according to some example implementations;

FIG. 7 schematically illustrates the surface shown in FIG. 4, and a test image of the surface that may be generated from a (second) scan, according to some example implementations;

FIGS. 8A and 8B schematically illustrate correlation of the test image and the mapped baseline image to produce a mapped test image, according to some example implementations;

FIG. 9 illustrates the surface with both the mapped baseline image and the mapped test image, according to some example implementations;

FIG. 10 illustrates a marker applied to the mapped test image at a location of an anomaly identified on the surface, according to some example implementations;

FIGS. 11A, 11B, 11C, 11D, 11E and 11F are flowcharts illustrating various steps in a method of non-destructive testing a surface of a vehicle, according to example implementations; and FIG. 12 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

Figure 1:
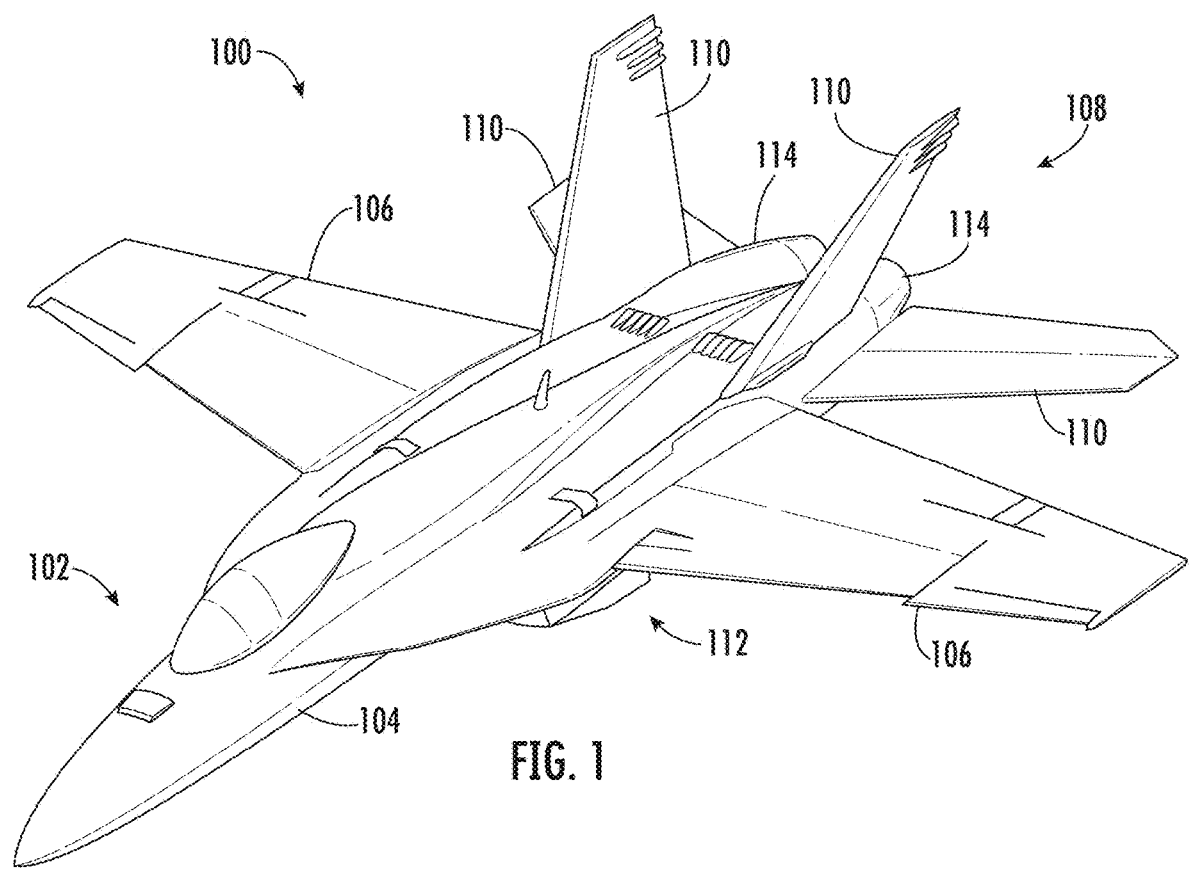
FIG. 1 illustrates one type of vehicle, namely, an aircraft that may benefit from example implementations of the present disclosure.

FIG. 1 illustrates one type of vehicle 100, namely, an aircraft that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system, hydraulic system and/or environmental system. Any number of other systems may be included.

Figure 2:
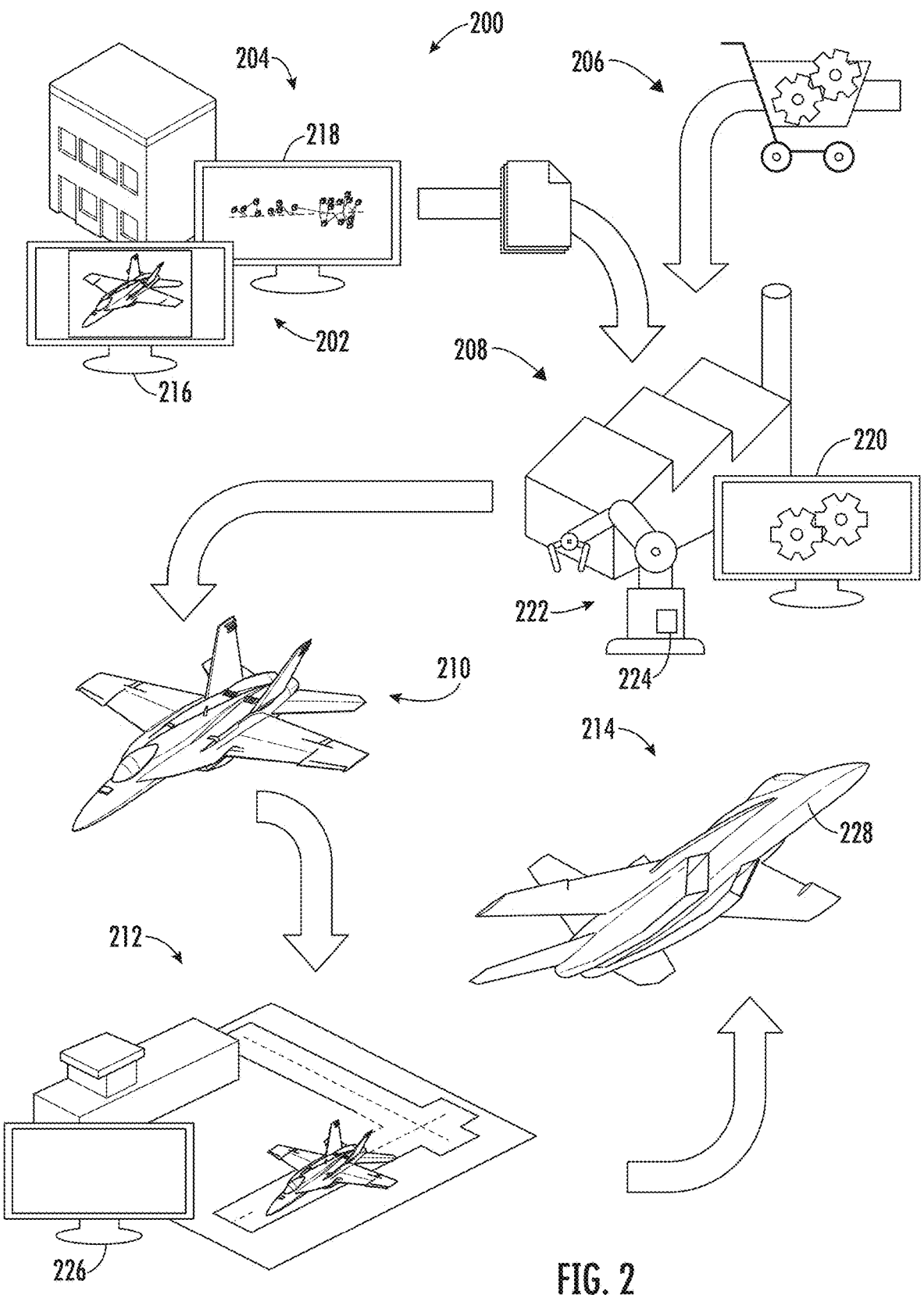
FIG. 2 illustrates an aircraft manufacturing and service method, according to some example implementations.

As explained above, example implementations of the present disclosure relate generally to vehicular engineering and, in particular, to one or more of the design, construction, operation or use of vehicles 100 such as the aircraft shown in FIG. 1. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for maintenance and service (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable to programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Figure 3:
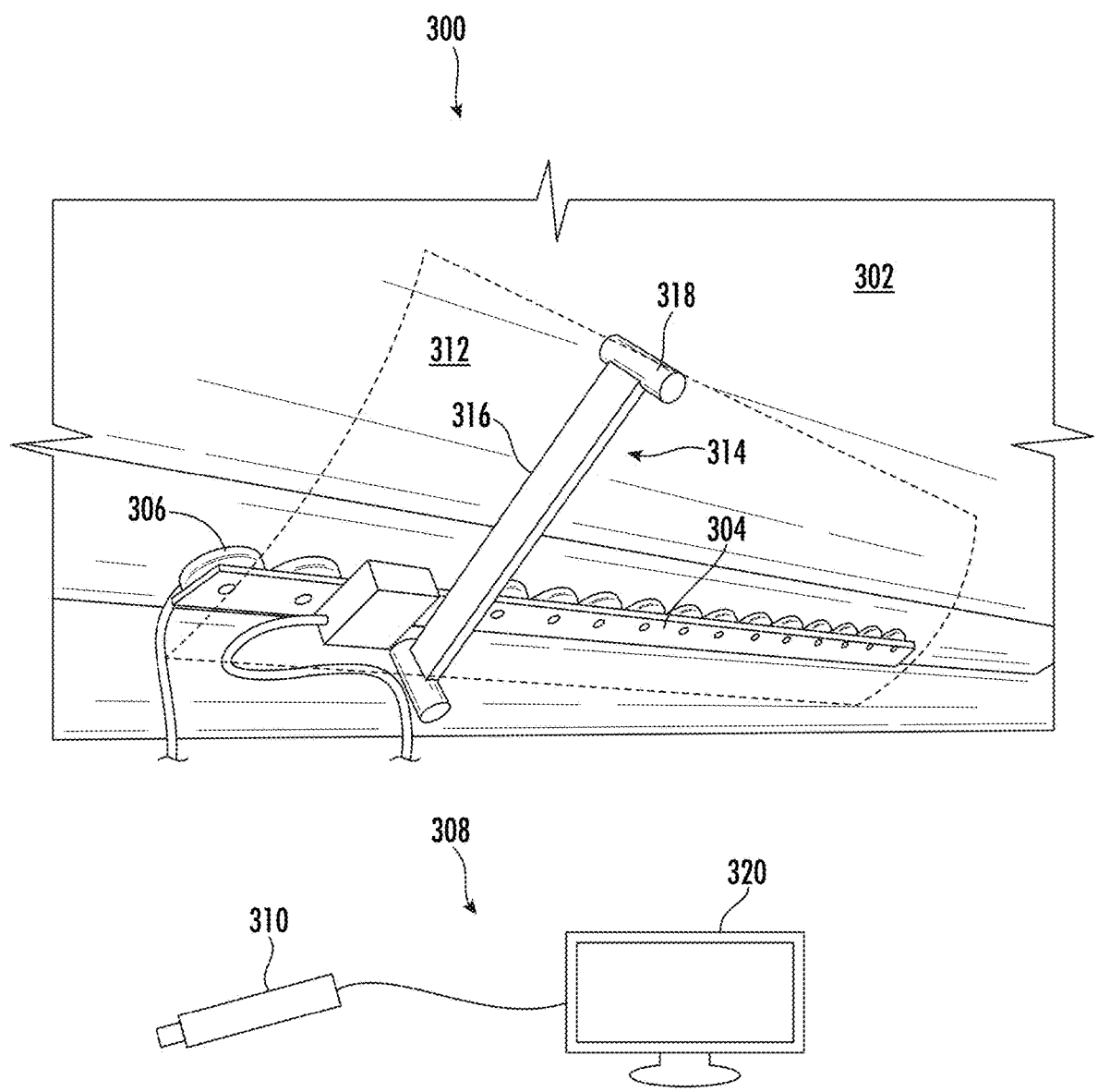
FIG. 3 illustrates a system for non-destructive testing a surface of a vehicle, 4 according to some example implementations.

Example implementations of the present disclosure may be implemented throughout the aircraft manufacturing and service method 200, but are particularly well suited for implementation during either or both production or in-service. In this regard, some example implementations provide a system and method of non-destructive testing of a vehicle 100 such as an aircraft. FIG. 3 illustrates a system 300 for non-destructive testing a surface 302 of a vehicle, according to some example implementations. As shown, the system includes a track 304 that is securable to the surface of the vehicle, and that is structured so that the track is contoured to the surface when secured. In the illustrated implementation, the track is secured to the surface of the vehicle with suction cups 306.

The system 300 includes an analytical system 308 with a sensor 310 that is be movable along the track 304 to perform a scan of a region 312 of the surface 302. In the illustrated implementation, the system may include a sensor assembly 314 that is securable to the track. The sensor assembly may include an arm 316 with a sensor head 318 for the sensor. The sensor assembly may also include an attachment for the track, and a motor to enable movement of the sensor assembly and thereby the sensor along the track. The sensor may be configured to perform the scan in any of a number of different manners. In various examples, the sensor may be configured to perform the scan using optical (e.g., laser) tracking, ultrasound, radio frequency (RF) signal inspection, or thermal-graphic inspection.

The analytical system 308 also includes a computer 320 that may be an example of a computer 224 or computer 226. The computer is configured to generate a baseline image of the surface 302 from the scan, and define a map of the surface from a computer model of the surface, which may be from a computer model of the vehicle. One example of a suitable computer model is a three-dimensional (3D) solid or surface model of the vehicle. The baseline image has a dot matrix data structure with a matrix of baseline data points, and the map includes a matrix of locations on the surface in a coordinate system of the vehicle 100. These locations may be expressed in a number of different manners, such as in x, y, z coordinates for the locations expressed in 3D. The computer, then, is configured to correlate the baseline image and the map to produce a mapped baseline image that includes the matrix of baseline data points registered to the locations from the matrix of the locations. This mapped baseline image is thus formatted for non-destructive testing of the surface without the track, which in some examples may include non-destructive testing below the surface. In this regard, the mapped baseline image may serve as an analytical digital twin for non-destructive testing of the vehicle.

In a more particular example, a region of interest on the surface 302 of the vehicle 100 may be identified from the computer model, and the map of the surface may be defined for this region of interest. The region of interest may also be used to determine where on the surface to setup and secure the track 304 to the surface so that the scan of the region 312 aligns with the region of interest and thereby the map of the surface. In some examples, a centerline of the region of interest may be determined in the coordinate system of the vehicle from the computer model, and this centerline may be used to determine a location on the surface at which to secure the track so that the sensor 310 scans the region 312 that corresponds to the region of interest when moved along the track.

FIG. 4 schematically illustrates a surface 400, and a baseline image 402 of the surface that may be generated from a scan, and that includes a centerline 404 of the baseline image, according to some example implementations. FIG. 5 schematically illustrates production of a mapped baseline image from the baseline image. As shown, the baseline image has a dot matrix data structure with a matrix of baseline data points, and a map 502 of the surface is defined that includes a matrix of locations (shown as x, y, z locations) on the surface in the coordinate system of the vehicle 100. The baseline image and the map, then, may be correlated to produce a mapped baseline image 504 that includes the matrix of baseline data points registered to the locations from the matrix of the locations.

As shown in FIG. 6, in some examples, the system 300 includes a testing system 600 with a (second) sensor 602 and a (second) computer, which may be the same as or different from the sensor 310 and the computer 320. The (second) sensor is configured to perform a (second) scan of the surface 302, at least partially within the region 312 and without the track 304. In various examples, the (second) scanner may be configured to perform the (second) scan using optical (e.g., laser) tracking, ultrasound, RF signal inspection, or thermal-graphic inspection.

Similar to the computer 320, the (second) computer 604 may be an example of a computer 224 or computer 226. The (second) computer is configured to generate a test image of the surface 302 from the (second) scan, with the test image having the dot matrix data structure with a matrix of test data points. The (second) computer is configured to access the mapped baseline image of the surface, and correlate the test image and the mapped baseline image to produce a mapped test image that includes the matrix of test data points registered to respective locations on the surface in the coordinate system of the vehicle 100. And the (second) computer is configured to perform non-destructive testing of the surface based on the mapped test image, such as to identify an anomaly on the surface 302 or below the surface. The anomaly may be detected according to any of a number of suitable techniques, such as those that involve computer vision, machine learning or the like to isolate the anomaly in the mapped test image.

The test image and the mapped baseline image may be correlated in a number of different manners. In some examples, the (second) computer 604 is configured to perform a feature recognition to identify features in the mapped baseline image, and corresponding features in the test image. A feature in this context is a region with one or more geometric or topological properties of interest. This feature recognition may be accomplished in a number of different manners, and may include use of commercially-available feature recognition software used in advanced image processing, computer vision and the like. The (second) computer is configured to align the features identified in the mapped baseline image, and the corresponding features identified in the test image. A set of the baseline data points, registered to a set of the locations on the surface 302, may then overlap a set of the test data points. And the (second) computer is configured to register the set of the test data points to the set of the locations on the surface to produce the mapped test image.

In some further examples, the set of the test data points are within the region 312 on the surface 302, and a (second) set of the test data points are outside the region on the surface. In some of these examples, the (second) computer 604 is configured to register the (second) set of the test data points to additional locations on the surface, based on the set of the test data points registered to the set of the locations on the surface, and the computer model of the surface.

FIG. 7 schematically illustrates the surface 400 shown in FIG. 4, and a test image 702 of the surface that may be generated from a (second) scan, according to some example implementations. FIGS. 8A and 8B schematically illustrate correlation of the test image and the mapped baseline image 504 to produce a mapped test image, according to some example implementations. And FIG. 9 illustrates the surface with both the mapped baseline image and the mapped test image.

As shown in FIGS. 8A and 8B, a feature recognition may be performed to identify features 802 in the mapped baseline image 504, and corresponding features 804 in the test image 702. The features identified in the mapped baseline image may then be aligned with the corresponding features identified in the test image. A set 806 of the baseline data points, registered to a set of the locations on the surface 400, may overlap a set 808 of the test data points; and the set of the test data points may be registered to the set of the locations on the surface to produce the mapped test image.

As shown in FIG. 8B, in some examples, the set 808 of the test data points of the test image 702 may be within the region on the surface 400 that is within the mapped baseline image 504, while a second set 810 of the test data points are outside the region on the surface. The second set of the test data points may then be registered to additional locations on the surface, based on the set of the test data points registered to the set of the locations on the surface, and the computer model of the surface. The mapped test image 810, then, may include the test image 702 with the set and the second set of the test data points registered to respectively the locations and additional locations on the surface.

In FIG. 9, the mapped baseline image 504 is shown with its centerline 404. In some examples, this centerline and endpoints of the mapped baseline image may be used as references to determine geometric transformations (e.g., U, V along the surface 400) between the baseline data points registered to the locations, and the test data points. The centerline is used in some of these examples because the width of the mapped baseline image and the test image 702 are known, while their lengths may vary. In other examples, other references may be used to determine the geometric transformations.

Also in FIG. 9, the mapped test image 810 is shown with a centerline 902 that includes a first centerline segment 902A that may be determined from the mapped baseline image 504. The centerline of the test image also includes a second centerline segment 902B that may be determined from the computer model such as by any of a number of different techniques to map a centerline to a three-dimensional body. In some examples, determining the second centerline segment may involve use of commercially-available computer-aided design (CAD) software, geometric algorithms or the like.

As shown in FIG. 10, in some examples, the (second) computer 604 is further configured to apply a marker 1002 to the mapped test image 810 at a location of an anomaly identified on the surface 400, and output the mapped test image including the marker for display. In some further examples, the (second) computer is further configured to associate the marker that is applied to the test image with information 1004 of whether an estimated size of the anomaly exceeds a predetermined threshold that indicates that a repair is required before further operation of the vehicle 100. And in some yet further examples, the marker that is applied to the test image is selectable to cause the (second) computer 604 to display information 1006 indicating the repair that is required for the anomaly, and any repair performed for the anomaly, to provide a digital record for the anomaly.

FIGS. 11A-11F are flowcharts illustrating various steps in a method 1100 of non-destructive testing a surface of a vehicle, according to various example implementations of the present disclosure. The method includes securing a track to the surface of the vehicle, the track structured so that the track is contoured to the surface when secured, as shown at block 1102 of FIG. 11A. The method includes moving a sensor along the track to perform a scan of a region of the surface, as shown at block 1104. The method includes generating a baseline image of the surface from the scan, the baseline image having a dot matrix data structure with a matrix of baseline data points, as shown at block 1106. The method includes defining a map of the surface from a computer model of the surface, the map including a matrix of locations on the surface in a coordinate system of the vehicle, as shown at block 1108. And the method includes correlating the baseline image and the map to produce a mapped baseline image that includes the matrix of baseline data points registered to the locations from the matrix of the locations, the mapped baseline image formatted for non-destructive testing of the surface without the track, as shown at block 1110.

In some examples, the scan is performed using ultrasound, radio frequency (RF) signal inspection, or thermal-graphic inspection, and the mapped baseline image is formatted for non-destructive testing below the surface.

In some examples, the method 1100 further includes performing a second scan of the surface with a second sensor, at least partially within the region and without the track, as shown at block 1112 of FIG. 11B. In some of these examples, the method includes generating a test image of the surface from the second scan, the test image having the dot matrix data structure with a matrix of test data points, as shown at block 1114. The method includes accessing the mapped baseline image of the surface, as shown at block 1116. The method includes correlating the test image and the mapped baseline image to produce a mapped test image that includes the matrix of test data points registered to respective locations on the surface in the coordinate system of the vehicle, as shown at block 1118. And the method includes performing a non-destructive testing of the surface based on the mapped test image, as shown at block 1120.

In some examples, the non-destructive testing is performed at block 1120 to identify an anomaly on the surface or below the surface.

In some examples, the second scan is performed at block 1112 using ultrasound, radio frequency (RF) signal inspection, or thermal-graphic inspection, and the non-destructive testing is performed to identify an anomaly below the surface.

In some examples, the method 1100 further includes applying a marker to the mapped test image at a location of the anomaly identified on the surface, and outputting the mapped test image including the marker for display, as shown at blocks 1122 and 1124 of FIG. 11C.

In some examples, the method 1100 further includes associating the marker that is applied to the test image with information of whether an estimated size of the anomaly exceeds a predetermined threshold that indicates that a repair is required before further operation of the vehicle, as shown at block 1126.

In some examples, the marker that is applied at block 1122 to the test image is selectable to cause a display of information indicating the repair that is required for the anomaly, and any repair performed for the anomaly, to provide a digital record for the anomaly. Accordingly, a test image display of the vehicle is generated that includes information for the one or more markers, and based on user selection of a respective marker of the one or more markers, information is displayed describing the one or more areas on the surface of the vehicle having a defect/anomaly that exceeds a predetermined threshold, and describing any repair of the defect, to provide a digital record for the defect and any repair of the defect for the vehicle.

In some examples, correlating the test image and the mapped baseline image at block 1118 includes performing a feature recognition to identify features in the mapped baseline image, and corresponding features in the test image, as shown at block 1128 of FIG. 11E. In some of these examples, the method includes aligning the features identified in the mapped baseline image, and the corresponding features identified in the test image, so that a set of the baseline data points, registered to a set of the locations on the surface, overlap a set of the test data points, as shown at block 1130. And the method includes registering the set of the test data points to the set of the locations on the surface, as shown at block 1132.

In some examples, the set of the test data points are within the region on the surface, and a second set of the test data points are outside the region on the surface. In some of these examples, correlating the test image and the mapped baseline image at block 1118 further includes registering the second set of the test data points to additional locations on the surface, based on the set of the test data points registered to the set of the locations on the surface, and the computer model of the surface, as shown at block 1134 of FIG. 11F.

According to example implementations of the present disclosure, the system 300 and its subsystems that include computers 320 and 604 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

FIG. 12 illustrates an apparatus 1200 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 1202 (e.g., processor unit) connected to a memory 1204 (e.g., storage device).

The processing circuitry 1202 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1204 (of the same or another apparatus).

The processing circuitry 1202 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1204 is generally any piece of computer hardware that is capable of storing information such as, for example, data, computer programs (e.g., computer-readable program code 1206) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1204, the processing circuitry 1202 may also be connected to one or more interfaces for displaying, transmitting and/or receiving information. The interfaces may include a communications interface 1208 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1200 may include a processing circuitry 1202 and a computer-readable storage medium or memory 1204 coupled to the processing circuitry, where the processing circuitry is configured to execute computer-readable program code 1206 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. A system for non-destructive testing a surface of a vehicle, the system comprising: a track that is securable to the surface of the vehicle, and that is structured so that the track is contoured to the surface when secured; and an analytical system including a sensor that is movable along the track to perform a scan of a region of the surface, and a computer configured to: generate a baseline image of the surface from the scan, the baseline image having a dot matrix data structure with a matrix of baseline data points; define a map of the surface from a computer model of the surface, the map including a matrix of locations on the surface in a coordinate system of the vehicle; and correlate the baseline image and the map to produce a mapped baseline image that includes the matrix of baseline data points registered to the locations from the matrix of the locations, the mapped baseline image formatted for non-destructive testing of the surface without the track.

Clause 2. The system of clause 1, wherein the sensor is configured to perform the scan using ultrasound, radio frequency (RF) signal inspection, or thermal-graphic inspection, and the mapped baseline image is formatted for non-destructive testing below the surface.

Clause 3. The system of clause 1 or clause 2, wherein the system further comprises a testing system including a second sensor configured to perform a second scan of the surface, at least partially within the region and without the track, and a second computer configured to: generate a test image of the surface from the second scan, the test image having the dot matrix data structure with a matrix of test data points; access the mapped baseline image of the surface; correlate the test image and the mapped baseline image to produce a mapped test image that includes the matrix of test data points registered to respective locations on the surface in the coordinate system of the vehicle; and perform a non-destructive testing of the surface based on the mapped test image.

Clause 4. The system of clause 3, wherein the non-destructive testing is performed to identify an anomaly on the surface or below the surface.

Clause 5. The system of clause 4, wherein the second sensor is configured to perform the second scan using ultrasound, radio frequency (RF) signal inspection, or thermal-graphic inspection, and the non-destructive testing is performed to identify an anomaly below the surface.

Clause 6. The system of clause 4 or clause 5, wherein the second computer is further configured to apply a marker to the mapped test image at a location of the anomaly identified on the surface, and output the mapped test image including the marker for display.

Clause 7. The system of clause 6, wherein the second computer is further configured to associate the marker that is applied to the test image with information of whether an estimated size of the anomaly exceeds a predetermined threshold that indicates that a repair is required before further operation of the vehicle.

Clause 8. The system of clause 7, wherein the marker that is applied to the test image is selectable to cause the second computer to display information indicating the repair that is required for the anomaly, and any repair performed for the anomaly, to provide a digital record for the anomaly.

Clause 9. The system of any of clauses 3 to 8, wherein the second computer configured to correlate the test image and the mapped baseline image includes the second computer configured to: perform a feature recognition to identify features in the mapped baseline image, and corresponding features in the test image; align the features identified in the mapped baseline image, and the corresponding features identified in the test image, so that a set of the baseline data points, registered to a set of the locations on the surface, overlap a set of the test data points; and register the set of the test data points to the set of the locations on the surface.

Clause 10. The system of clause 9, wherein the set of the test data points are within the region on the surface, and a second set of the test data points are outside the region on the surface, and wherein the second computer configured to correlate the test image and the mapped baseline image further includes the second computer configured to register the second set of the test data points to additional locations on the surface, based on the set of the test data points registered to the set of the locations on the surface, and the computer model of the surface.

Clause 11. A system for non-destructive testing a surface of a vehicle, the system comprising: a sensor configured to perform a scan of a region of the surface, without a track secured to the surface; and a computer configured to at least: generate a test image of the surface from the scan, the test image having a dot matrix data structure with a matrix of test data points; access a mapped baseline image of the surface that includes a matrix of baseline data points registered to locations from a matrix of locations on the surface in a coordinate system of the vehicle; correlate the test image and the mapped baseline image to produce a mapped test image that includes the matrix of test data points registered to respective locations on the surface in the coordinate system of the vehicle; and perform a non-destructive testing of the surface based on the mapped test image.

Clause 12. The system of clause 11, wherein the non-destructive testing is performed to identify an anomaly on the surface or below the surface.

Clause 13. The system of clause 12, wherein the sensor is configured to perform the scan using ultrasound, radio frequency (RF) signal inspection, or thermal-graphic inspection, and the non-destructive testing is performed to identify an anomaly below the surface.

Clause 14. The system of clause 12 or clause 13, wherein the computer is further configured to apply a marker to the mapped test image at a location of the anomaly identified on the surface, and output the mapped test image including the marker for display.

Clause 15. The system of clause 14, wherein the computer is further configured to associate the marker that is applied to the test image with information of whether an estimated size of the anomaly exceeds a predetermined threshold that indicates that a repair is required before further operation of the vehicle.

Clause 16. The system of clause 15, wherein the marker that is applied to the test image is selectable to cause the computer to display information indicating the repair that is required for the anomaly, and any repair performed for the anomaly, to provide a digital record for the anomaly.

Clause 17. The system of any of clauses 11 to 16, wherein the computer configured to correlate the test image and the mapped baseline image includes the computer configured to: perform a feature recognition to identify features in the mapped baseline image, and corresponding features in the test image; align the features identified in the mapped baseline image, and the corresponding features identified in the test image, so that a set of the baseline data points, registered to a set of the locations on the surface, overlap a set of the test data points; and register the set of the test data points to the set of the locations on the surface.

Clause 18. The system of clause 17, wherein the set of the test data points are within the region on the surface, and a second set of the test data points are outside the region on the surface, and wherein the computer configured to correlate the test image and the mapped baseline image further includes the computer configured to register the second set of the test data points to additional locations on the surface, based on the set of the test data points registered to the set of the locations on the surface, and the computer model of the surface.

Clause 19. A method of non-destructive testing a surface of a vehicle, the method comprising: securing a track to the surface of the vehicle, the track structured so that the track is contoured to the surface when secured; moving a sensor along the track to perform a scan of a region of the surface; generating a baseline image of the surface from the scan, the baseline image having a dot matrix data structure with a matrix of baseline data points; defining a map of the surface from a computer model of the surface, the map including a matrix of locations on the surface in a coordinate system of the vehicle; and correlating the baseline image and the map to produce a mapped baseline image that includes the matrix of baseline data points registered to the locations from the matrix of the locations, the mapped baseline image formatted for non-destructive testing of the surface without the track.

Clause 20. The method of clause 19, wherein the scan is performed using ultrasound, radio frequency (RF) signal inspection, or thermal-graphic inspection, and the mapped baseline image is formatted for non-destructive testing below the surface.

Clause 21. The method of clause 19 or clause 20, wherein the method further comprises: performing a second scan of the surface with a second sensor, at least partially within the region and without the track; generating a test image of the surface from the second scan, the test image having the dot matrix data structure with a matrix of test data points; accessing the mapped baseline image of the surface; correlating the test image and the mapped baseline image to produce a mapped test image that includes the matrix of test data points registered to respective locations on the surface in the coordinate system of the vehicle; and performing a non-destructive testing of the surface based on the mapped test image.

Clause 22. The method of clause 21, wherein the non-destructive testing is performed to identify an anomaly on the surface or below the surface.

Clause 23. The method of clause 22, wherein the second scan is performed using ultrasound, radio frequency (RF) signal inspection, or thermal-graphic inspection, and the non-destructive testing is performed to identify an anomaly below the surface.

Clause 24. The method of clause 22 or clause 23, wherein the method further comprises applying a marker to the mapped test image at a location of the anomaly identified on the surface, and outputting the mapped test image including the marker for display.

Clause 25. The method of clause 24, wherein the method further comprises associating the marker that is applied to the test image with information of whether an estimated size of the anomaly exceeds a predetermined threshold that indicates that a repair is required before further operation of the vehicle.

Clause 26. The method of clause 25, wherein the marker that is applied to the test image is selectable to cause a display of information indicating the repair that is required for the anomaly, and any repair performed for the anomaly, to provide a digital record for the anomaly.

Clause 27. The method of any of clauses 21 to 26, wherein correlating the test image and the mapped baseline image includes: performing a feature recognition to identify features in the mapped baseline image, and corresponding features in the test image; aligning the features identified in the mapped baseline image, and the corresponding features identified in the test image, so that a set of the baseline data points, registered to a set of the locations on the surface, overlap a set of the test data points; and registering the set of the test data points to the set of the locations on the surface.

Clause 28. The method of clause 27, wherein the set of the test data points are within the region on the surface, and a second set of the test data points are outside the region on the surface, and wherein correlating the test image and the mapped baseline image further includes registering the second set of the test data points to additional locations on the surface, based on the set of the test data points registered to the set of the locations on the surface, and the computer model of the surface.

Clause 29. A method of non-destructive testing a surface of a vehicle, the method comprising: performing a scan of a region of the surface with a sensor, without a track secured to the surface; generating a test image of the surface from the scan; the test image having a dot matrix data structure with a matrix of test data points; accessing a mapped baseline image of the surface that includes a matrix of baseline data points registered to locations from a matrix of locations on the surface in a coordinate system of the vehicle; correlating the test image and the mapped baseline image to produce a mapped test image that includes the matrix of test data points registered to respective locations on the surface in the coordinate system of the vehicle; and performing a non-destructive testing of the surface based on the mapped test image.

Clause 30. The method of clause 29, wherein the non-destructive testing is performed to identify an anomaly on the surface or below the surface.

Clause 31. The method of clause 30, wherein the scan is performed using ultrasound, radio frequency (RE) signal inspection, or thermal-graphic inspection, and the non-destructive testing is performed to identify an anomaly below the surface.

Clause 32. The method of clause 30 or clause 31, wherein the method further comprises applying a marker to the mapped test image at a location of the anomaly identified on the surface, and outputting the mapped test image including the marker for display.

Clause 33. The method of clause 32, wherein the method further comprises associating the marker that is applied to the test image with information of whether an estimated size of the anomaly exceeds a predetermined threshold that indicates that a repair is required before further operation of the vehicle.

Clause 34. The method of clause 33, wherein the marker that is applied to the test image is selectable to cause a display of information indicating the repair that is required for the anomaly, and any repair performed for the anomaly, to provide a digital record for the anomaly.

Clause 35. The method of any of clauses 29 to 34, wherein correlating the test image and the mapped baseline image includes: performing a feature recognition to identify features in the mapped baseline image, and corresponding features in the test image; aligning the features identified in the mapped baseline image, and the corresponding features identified in the test image, so that a set of the baseline data. points, registered to a set of the locations on the surface, overlap a set of the test data points; and registering the set of the test data points to the set of the locations on the surface.

Clause 36. The method of clause 35, wherein the set of the test data points are within the region on the surface, and a second set of the test data points are outside the region on the surface, and wherein correlating the test image and the mapped baseline image further includes registering the second set of the test data points to additional locations on the surface, based on the set of the test data points registered to the set of the locations on the surface, and the computer model of the surface.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for non-destructive testing of a surface of a vehicle, the system comprising:
    a track that is configured to be secured to the surface of the vehicle, and that is structured so that the track is contoured to the surface when secured; and
    an analytical system including:
        a sensor assembly that is configured to be secured on the track and configured to move along the track to perform a scan of a region of the surface, wherein the sensor assembly includes a sensor, and
        a computer in communication with the sensor, the computer configured to:
            generate a baseline image of the surface from the scan, the baseline image having a dot matrix data structure with a matrix of baseline data points;
            define a map of the surface from a computer model of the surface, the map including a matrix of locations on the surface in a coordinate system of the vehicle,
                wherein a centerline of the region is determined in the coordinate system of the vehicle from the computer model, and
                wherein the track is secured at a location on the surface based on using the centerline to determine the location; and
            correlate the baseline image and the map to produce a mapped baseline image that includes the matrix of baseline data points registered to the locations from the matrix of the locations, the mapped baseline image formatted for non-destructive testing of the surface without the track; and;
    a testing system including:
        a second sensor configured to perform a second scan of the surface, at least partially within the region and without the track; and
        a second computer in communication with the second sensor, the second computer configured to:
            generate a test image of the surface from the second scan, the test image having the dot matrix data structure with a matrix of data points;
            access the mapped baseline image of the surface produced by the computer;
            correlate the test image and the mapped baseline image to produce a mapped test image that includes the matrix of test points registered to respective locations on the surface in the coordinate system of the vehicle;
            perform a non-destructive testing of the surface based on the mapped test image; and
            validate integrity of structure of the surface based on the non-destructive testing.

2. The system of claim 1, wherein the sensor is configured to perform the scan using ultrasound, radio frequency (RF) signal inspection, or thermal-graphic inspection, and the mapped baseline image is formatted for non-destructive testing below the surface.

3. The system of claim 1, wherein the non-destructive testing is performed to identify an anomaly on the surface or below the surface.

4. The system of claim 3, wherein the second sensor is configured to perform the second scan using ultrasound, radio frequency (RF) signal inspection, or thermal-graphic inspection, and the non-destructive testing is performed to identify an anomaly below the surface.

5. The system of claim 3, wherein the second computer is further configured to apply a marker to the mapped test image at a location of the anomaly identified on the surface, and output the mapped test image including the marker for display.

6. The system of claim 5, wherein the second computer is further configured to associate the marker that is applied to the test image with information of whether an estimated size of the anomaly exceeds a predetermined threshold that indicates that a repair is required before further operation of the vehicle.

7. The system of claim 6, wherein the marker that is applied to the test image is selectable to cause the second computer to display information indicating the repair that is required for the anomaly, and any repair performed for the anomaly, to provide a digital record for the anomaly.

8. The system of claim 1, wherein the second computer configured to correlate the test image and the mapped baseline image includes the second computer configured to:
    perform feature recognition to identify features in the mapped baseline image, and corresponding features in the test image;
    align the features identified in the mapped baseline image, and the corresponding features identified in the test image, so that a set of the baseline data points, registered to a set of the locations on the surface, overlap a set of test data points; and
    register the set of the test data points to the set of the locations on the surface.

9. The system of claim 8, wherein the set of the test data points are within the region on the surface, and a second set of the test data points are outside the region on the surface, and wherein the second computer is configured to correlate the test image and the mapped baseline image, and the second computer is further configured to register the second set of the test data points to additional locations on the surface, based on the set of the test data points registered to the set of the locations on the surface, and based on the computer model of the surface.

10. The system of claim 1, wherein the sensor and the second sensor are the same sensor, and the computer and the second computer are the same computer.

11. A system for non-destructive testing a surface of a vehicle, the system comprising:

a sensor configured to perform a scan of a region of the surface, without a track secured to the surface; a computer in communication with the sensor, the computer configured to at least:

generate a test image of the surface from the scan, the test image having a dot matrix data structure with a matrix of test data points;

access a mapped baseline image of the surface that includes a matrix of baseline data points registered to locations from a matrix of locations on the surface in a coordinate system of the vehicle;

wherein a centerline of the region is determined in the coordinate system of the vehicle from the computer model, and wherein the track is secured at a location on the surface based on using the centerline to determine the location; and correlate the test image and the mapped baseline image to produce a mapped test image that includes the matrix of test data points registered to respective locations on the surface in the coordinate system of the vehicle;

perform a non-destructive testing of the surface based on the mapped test image; and validate integrity and fitness of structure of the surface based on the non-destructive testing.

12. A method of non-destructive testing a surface of a vehicle, the method comprising:

securing a track to the surface of the vehicle, the track structured so that the track is contoured to the surface when secured;

moving a sensor along the track to perform a scan of a region of the surface, wherein the sensor is moved along the track and the scan of the region are each performed via a computer;

generating a baseline image of the surface from the scan, the baseline image having a dot matrix data structure with a matrix of baseline data points, wherein the baseline image of the surface from the scan is generated via the computer;

defining a map of the surface from a computer model of the surface, the map including a matrix of locations on the surface in a coordinate system of the vehicle, wherein the map of the surface from the computer model of the surface is defined via the computer, wherein a centerline of the region is determined in the coordinate system of the vehicle from the computer model, and wherein the track is secured at a location on the surface based on using the centerline to determine the location;

correlating the baseline image and the map to produce a mapped baseline image that includes the matrix of baseline data points registered to the locations from the matrix of the locations, the mapped baseline image formatted for non-destructive testing of the surface without the track, wherein the baseline image and the map to produce the baseline image are correlated via the computer;

performing a second scan of the surface with a second sensor, at least partially within the region and without the track, wherein the second scan is performed via a second computer;

generating, via the second computer, a test image of the surface from the second scan, the test image having the dot matrix data structure with a matrix of test data points;

accessing, via the second computer, the mapped baseline image of the surface generated by the computer;

correlating, via the second computer, the test image and the mapped baseline image of the surface generated by the computer to produce a mapped test image that includes the matrix of test data points registered to respective locations on the surface in the coordinate system of the vehicle;

performing, via the second computer, a non-destructive testing of the surface based on the mapped test image; and validating integrity of structure of the surface based on the non-destructive testing.

13. The method of claim 12, wherein the scan is performed using ultrasound, radio frequency (RF) signal inspection, or thermal-graphic inspection, and the mapped baseline image is formatted for non-destructive testing below the surface.

14. The method of claim 13, wherein the non-destructive testing is performed to identify an anomaly on the surface or below the surface.

15. The method of claim 14, wherein the second scan is performed using ultrasound, radio frequency (RF) signal inspection, or thermal-graphic inspection, and the non-destructive testing is performed to identify an anomaly below the surface.

16. The method of claim 14, wherein the method further comprises applying a marker to the mapped test image at a location of the anomaly identified on the surface, and outputting the mapped test image including the marker for display.

17. The method of claim 16, wherein the method further comprises associating the marker that is applied to the test image with information of whether an estimated size of the anomaly exceeds a predetermined threshold that indicates that a repair is required before further operation of the vehicle.

18. The method of claim 12, wherein correlating the test image and the mapped baseline image includes:

performing a feature recognition to identify features in the mapped baseline image, and corresponding features in the test image;

aligning the features identified in the mapped baseline image, and the corresponding features identified in the test image, so that a set of the baseline data points, registered to a set of the locations on the surface, overlap a set of the test data points; and registering the set of the test data points to the set of the locations on the surface.

19. The method of claim 18, wherein the set of the test data points are within the region on the surface, and a second set of the test data points are outside the region on the surface, and wherein correlating the test image and the mapped baseline image further includes registering the second set of the test data points to additional locations on the surface, based on the set of the test data points registered to the set of the locations on the surface, and the computer model of the surface.

20. The method of claim 12, wherein the sensor and the second sensor are the same sensor, and the computer and the second computer are the same computer.

* * * * *